Patented Oct. 24, 1944

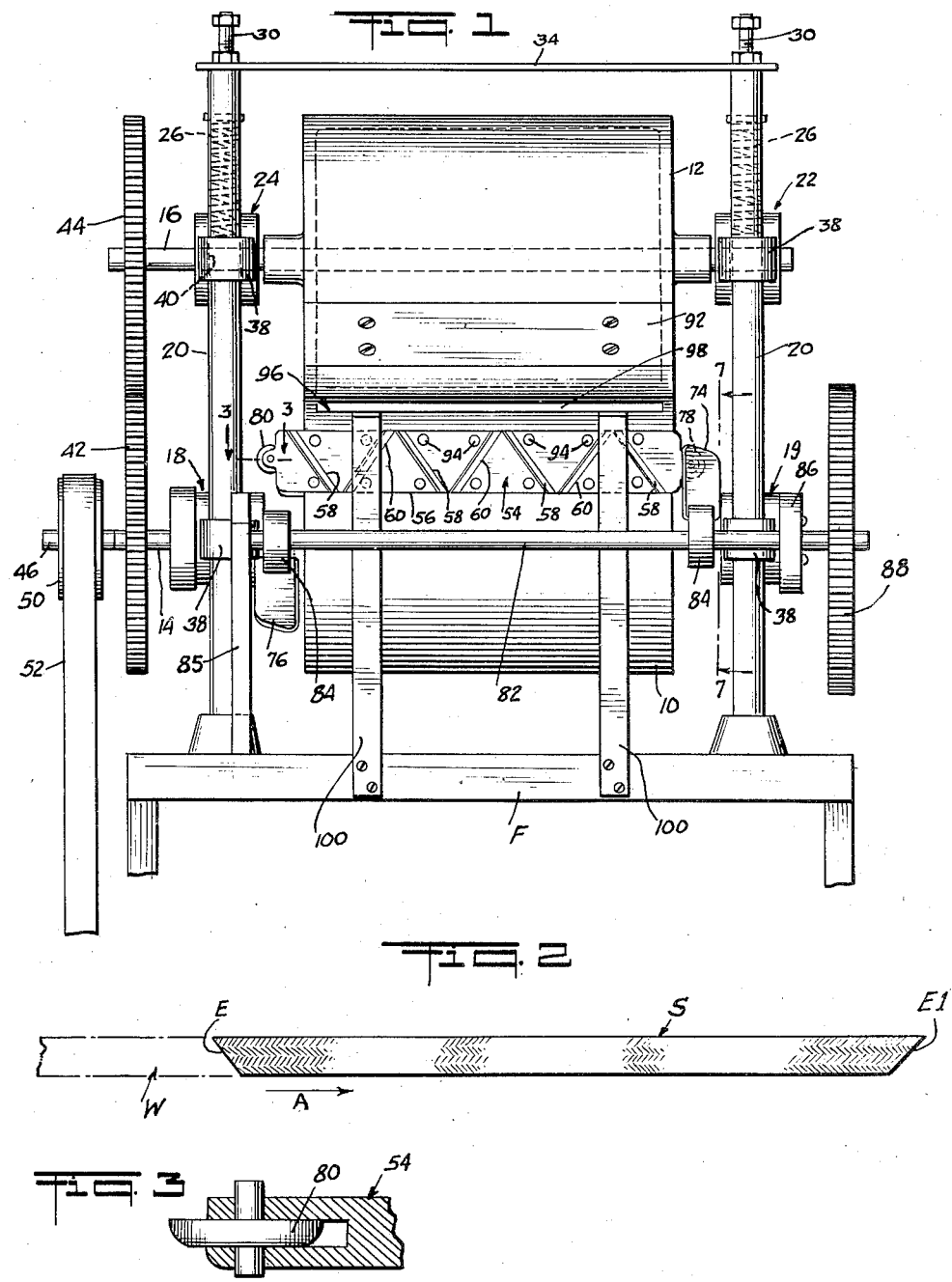

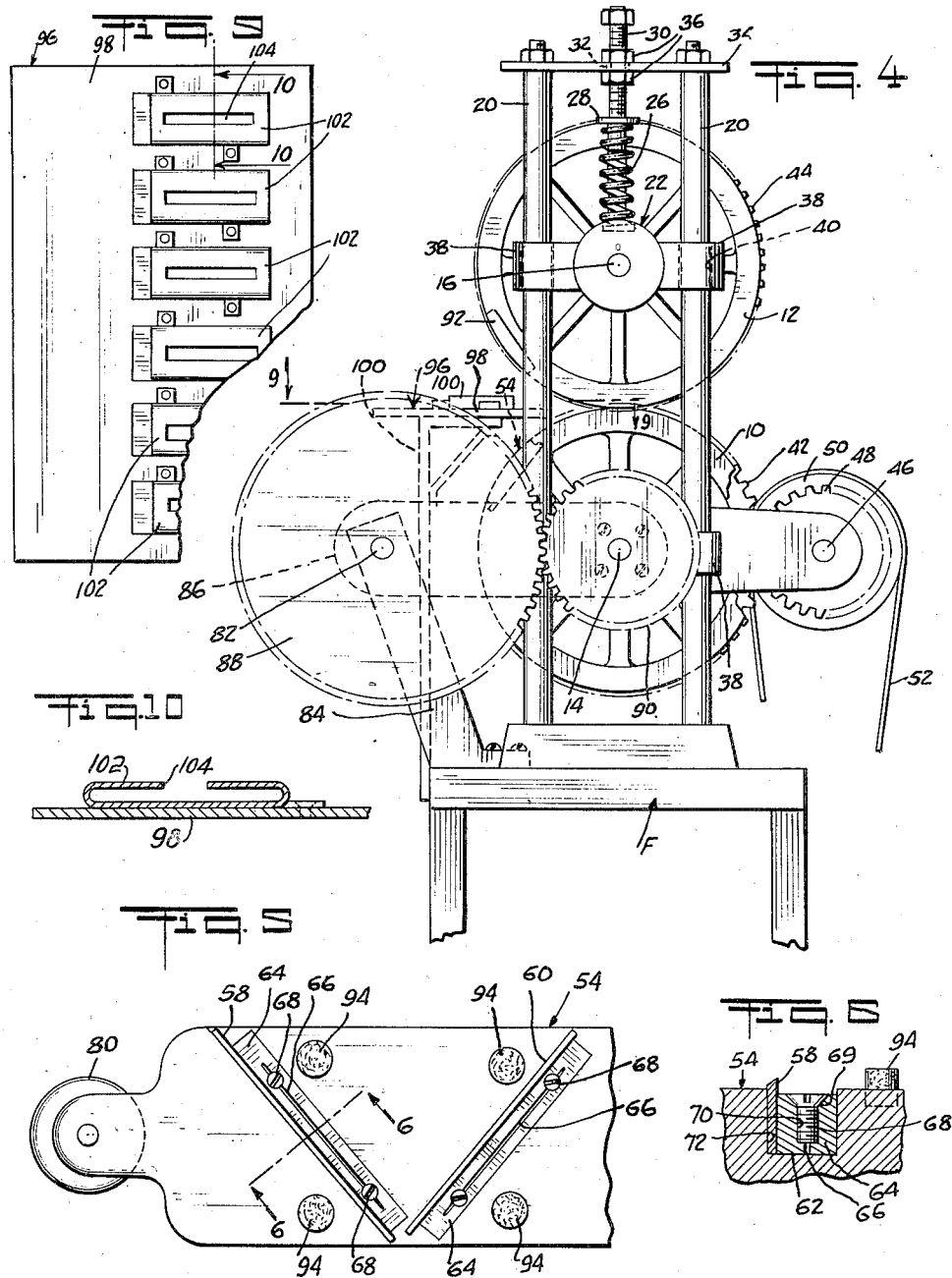

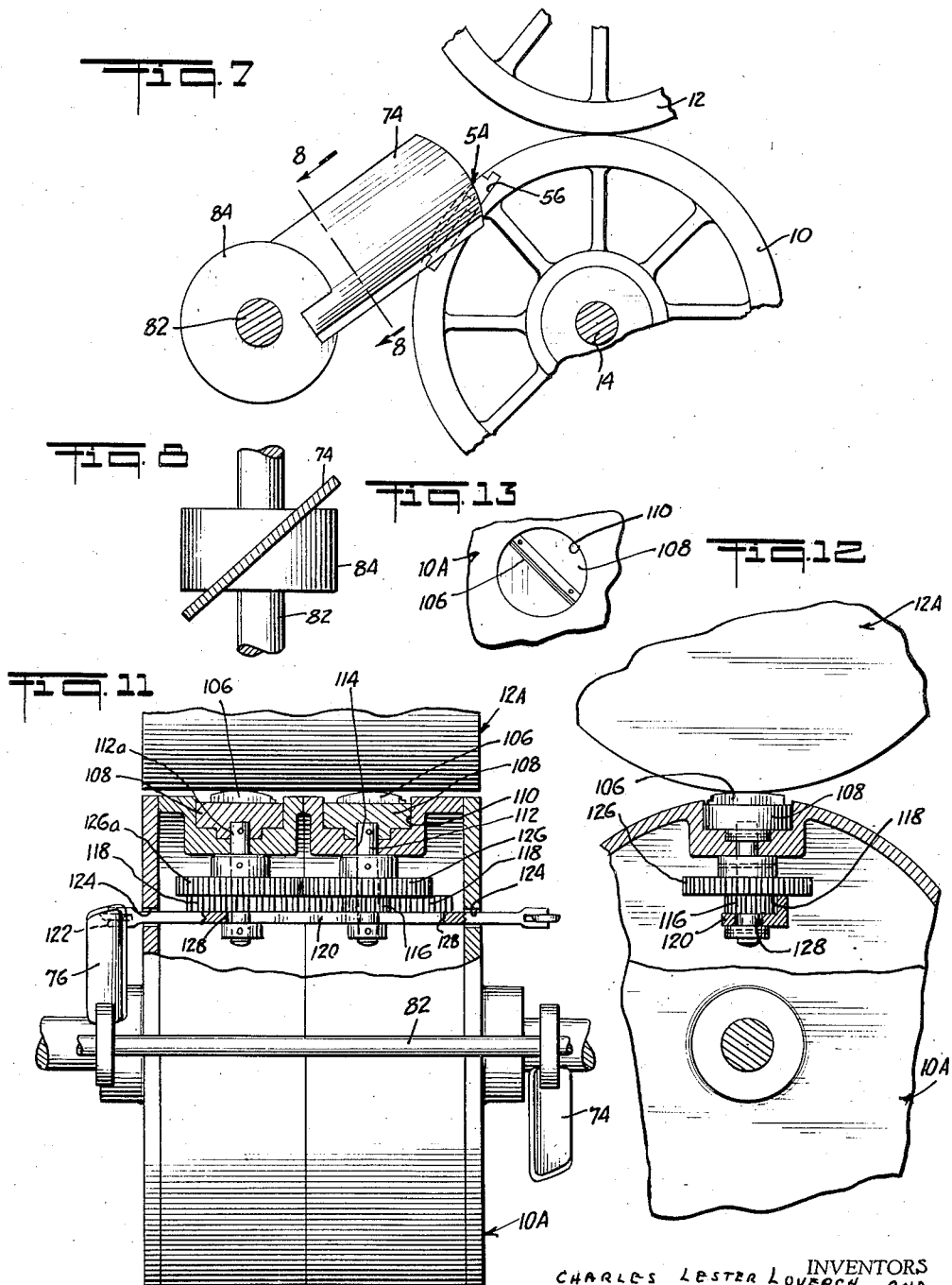

2,361,300

UNITED STATES PATENT OFFICE 2,361,300

CUTTING MACHINE

Charles Lester Loverch and Jacob K. Rubin, Brooklyn, N. Y.

Application July 20, 1942, Serial No. 451,640

18 Claims. (Cl. 164—68)

This invention relates to machines for cutting strips from a web of sheet material.

One object of the present invention is to provide a machine for cutting said strips and for providing said strips at the opposite ends thereof with edges inclined in opposite directions, respectively, to the length of the strip.

Another object of the invention is the provision of a cutting machine which is operable to sever the web into a plurality of strips by cutting the web along transverse lines spaced longitudinally of the web and inclined, alternately, in different directions to the longitudinal line of run of the web.

A yet further object of the invention is generally to provide a machine which is simple in construction and which operates efficiently to cut a web for producing strips having their opposite ends oppositely inclined as indicated above.

The above and other objects, features and advantages of the invention will be fully understood from the following description, considered with reference to the accompanying illustrative drawings.

In the drawings:

Fig. 1 is a side view, in elevation, of a cutting machine embodying the present invention;

Fig. 2 is a plan view of a strip cut from a web in accordance with the present invention;

Fig. 3 is a detail sectional view on the line 3—3 of Fig. 1;

Fig. 4 is an end view, in elevation, of the machine shown in Fig. 1, said view being taken looking from the right of Fig. 1;

Fig. 5 is a fragmentary plan view, on a larger scale, of the cutting means;

Fig. 6 is a sectional view on the line 6—6 of Fig. 5;

Fig. 7 is a sectional view, on a larger scale, on the line 7—7 of Fig. 1;

Fig. 8 is a sectional view on the line 8—8 of Fig. 7;

Fig. 9 is a plan view of the support and guides for the webs, said view being taken on the line 9—9 of Fig. 4;

Fig. 10 is a detail sectional view on the line 10—10 of Fig. 9;

Fig. 11 is a side view of part of the machine, showing a modification, a part of one of the rollers being broken away for the purpose of illustration;

Fig. 12 is an end view of parts shown in Fig. 11, an end portion of the roller being broken away for the purpose of illustration;

Fig. 13 is a fragmentary side view of one of the rollers, showing a cutter member carried thereby;

Fig. 14 is a plan view taken on the line 14—14 of Fig. 15, illustrating a modification of the mechanism for positioning the cutting means longitudinally of the roller;

Fig. 15 is a sectional view on the line 15—15 of Fig. 14.

The machine of the present invention is operable to cut a plurality of strips like the strip S shown in Fig. 2 from a continuous web of cloth or other sheet material, a very small portion of the web being shown in dot and dash lines at W. More specifically, when the web W is moved in the direction of arrow A, the machine operates to cut in succession therefrom a plurality of strips S, the opposite ends of each strip having cut edges E and E1, respectively, extending at different angles, respectively, to the longitudinal line of the strip, said edges being here shown as oppositely inclined to said line. The strips thus provided with these oppositely inclined end edges are intended to be attached at said edges to a bandolier to provide a shoulder strap for supporting the bandolier on the wearer, but it is to be understood, of course, that the present invention is not limited to any specific use of strips or straps having these oppositely inclined edges.

Referring now more specifically to the illustration of the machine provided in accordance with the preferred embodiment of the invention for producing strips with the oppositely inclined edges, said machine comprises a pair of rollers 10 and 12 fixed to and rotatable by shafts 14 and 16, respectively. Shaft 14 is journalled for rotation in bearings 18 and 19, secured to a companion pair of upright posts 20 fixed to the top of the supporting frame F. Bearings 22 and 24 have shaft 16 journalled therein, said bearings 22 and 24 being slidable on a companion pair of posts 20. As roller 12 is preferably spring pressed toward roller 10, springs 26 are provided, one spring for each of bearings 22 and 24, for urging roller 12 resiliently and with considerable pressure against roller 10. As shown in Fig. 4, spring 26 bears at its lower end against its companion bearing and bears at its upper end against a collar 28 fixed to an adjusting screw 30. Screw 30 is adjustable through an opening 32 in member 34, the latter being removably fixed at its opposite ends to the adjacent pair of posts 20. Screw 30 is removably secured in adjusted position by a pair of nuts 36. It will be understood that the spring arrangement on the adjusting screw 30 illustrated in Fig. 4 in connection with bearing 22 is duplicated in connection with bearing 24. All of the bearings 18 to 24, inclusive, are of the same construction, except that bearings 18 and 19 are fixed, as by said screws or any other suitable way (not shown) to posts 20, while on the other hand bearings 22 and 24 are movable longitudinally of said posts. Accordingly, the side view of bearing 22 in Fig. 4 is to be considered as a side view of each of the other bearings. By reference to Figs. 1 and 4 it will be noted that bearing 22 has lateral extensions 38, each provided with an opening 40 in which the companion post 20 has a slidable fit. The other bearings have similar lateral extensions with openings through which the companion posts project.

Shaft 14 is geared to shaft 16 by gears 42 and 44 fixed to shafts 14 and 16, respectively, said gears being of the same diameter whereby rollers 10 and 12 are rotatable at the same speed of rotation. Shaft 14 is geared to a counter-shaft 46 by a gear 48 which is fixed to said countershaft and meshes with gear 42 (Fig. 4). Counter-shaft 46 is driven by a pulley 50 which is fixed thereto and which is actuated by a belt 52 driven by a motor (not shown) or in any other way. Accordingly both rollers are driven by this mechanism.

The cutting means for severing the strips from the web and for providing each strip with the inclined end edges E and E1 will now be described. Said cutting means comprises a carrier member, here shown as a plate 54 slidably mounted on roller 10 longitudinally theeorf in a groove 56 for reciprocation in a path transversely of the paths of the webs which are fed to rollers 10 and 12. Said plate carries a plurality of cutting members 58, each having the same inclination to the line of feed of the web through rollers 10 and 12, and a plurality of cutting members 60 having a different inclination to said line of feed or travel of the web to and between said rollers. A pair of cutting members 58 and 60 act on one web for severing strips S therefrom and for cutting the opposite ends of each strip along oppositely inclined lines E and E1. There are a plurality of each of the cutting members 58 and 60 so that a plurality of webs may be cut simultaneously by feeding said webs to and between rollers 10 and 12 in laterally spaced relation as will hereinafter be more specifically described.

As illustrated in Figs. 5 and 6, each cutting member, here shown as a cutting member 58, is secured in a groove 62 by a clamping bar 64. Said clamping bar has a longitudinally extending slot 66 extending between its ends, and a pair of clamping screws 68 are threaded into openings 70, the construction being such that when said screws 68 are threaded into their companion openings, bar 64 is spread laterally, by the tapered heads 69 of said screws, for clamping one side of the cutting member against the adjacent side 72 of groove 62 whereby to releasably secure said cutting member in said groove. It will be understood that each of the cutting members 58 and 60 are secured in a companion groove 62 by a clamping bar 64 as illustrated in Figs. 5 and 6.

It will be noted that the cutting members 58 and 60 are positioned so that their cutting edges extend transversely of the webs and are arranged in a row which extends in the direction of reciprocatory movement of said carrier plate 54. When the machine is designed for cutting only one web at a time, only one pair of cutting members 58 and 60 is necessary, but where as in the illustrated machine it is desired to cut a plurality of webs simultaneously, a plurality of each of members 58 and 60 is required.

When plate 54 is in one position, longitudinally of roller 10, and the cutting members are at the bight of rollers 10 and 12, cutting members 58 are positioned to engage and cut some of the webs at the bight of rollers 10 and 12, and cutting members 60 are positioned to engage and cut the other webs at the bight of the rollers. Subsequently, during the next revolution of rollers 10 and 12, plate 54 is moved longitudinally of roller 10 to a position in which cutting members 58 are positioned to engage and cut said last mentioned webs while cutting members 60 are positioned to engage and cut the webs just previously cut by members 58.

It will be observed by reference to Fig. 1 that a cutter 60 is intermediate two cutters 58, there being one cutter 58 at each side of any cutter 60, and that in a set of three cutters thus related, a cutter 60 is in diverging relation with each of the adjacent cutters 58. The diverging relation of said cutter 60 and one adjacent cutter 58 is, it will be noted, the reverse of the diverging relation between said cutter 60 and the other adjacent cutter 58. Similarly in a set of three cutters, cutter 58 may be an intermediate cutter in respect to two cutters 60 at opposite sides, respectively, of said cutter 58. By reason of this arrangement of cutters 58 and 60 in sets of three, two adjacent webs are cut simultaneously, first by an intermediate cutter and one of the adjacent cutters, respectively, of the set of three cuters and then, after one revolution of rollers 10 and 12, said webs are cut simultaneously by the third cutter and by said intermediate cutter, respectively, of said set. As cutters 58 and 60 are oppositely inclined to the line of travel of each web, and as these cutters alternately engage the same web during the longitudinal movement thereof, each strip cut from the web is simultaneously provided with the oppositely inclined end edges E1 and E2.

Provision is made for reciprocating plate 54 whereby to properly position said cutting members 58 and 60 in timed relation to the rotation of rollers 10 and 12. For this purpose, the machine is provided, in the preferred embodiment herein disclosed, with a cam mechanism which will now be described. This cam mechanism comprises cams 74 and 76 arranged to engage rollers 78 and 80 which are mounted at the opposite ends, respectively, of plate 54. Cams 74 and 76 are of the same construction but are displaced 180 degrees with respect to each other on cam shaft 82. Each of the cams 74 and 76 is in fixed relation to cam shaft 82, being secured to said shaft by a collar 84 (Figs. 1, 7 and 8). Cam shaft 82 is journalled at its opposite ends for rotation in bearings provided in brackets 85 and 86, respectively, bracket 85 being fastened to the top of frame F and bracket 86 being fixed to bearing 19. Cam shaft 82 is geared to shaft 14 by gears 88 and 90 which are in mesh with each other and which are fixed to said shafts 82 and 14, respectively. Gears 88 and 90 have a 2:1 ratio so that shaft 14 makes two revolutions for each revolution of shaft 82 whereby plate 54 is moved to the above described two positions thereof during each revolution of rollers 10 and 12. In this case, the length of each strip S severed from the web is equal to the circumference of roller 10 or of roller 12 since the two rollers are of equal circumference. It will be understood, however, that it is within the scope of the present invention to cut strips of shorter lengths from the web, this being readily accomplished by changing the ratio of gears 88 and 90.

Rollers 10 and 12 are preferably formed of cast iron and cutting plate 54 and cutting members 58 and 60 are formed of steel. Since roller 12 is preferably formed of cast iron, it is provided with a steel wear plate 92 which is engaged by the cutting edges of cutting members 58 and 60 during the cutting action. It will be understood that cutting members 58 and 60 project slightly beyond the periphery of roller 10 and that as a result thereof roller 12 is raised slightly against the action of gravity and the pressure of springs 26 during the cutting action. At other times, rollers 10 and 12 are effective to draw the web therebetween for advancing the web through the machine. However, in order to prevent the disengagement of the leading cut end of the web from between the rollers, plate 54 is provided with rubber or other resilient gripping members 94 fixed in plate 54 in position to press the leading end of the companion web against roller 12.

The guiding means 96 is provided for guiding a plurality of webs in laterally spaced relation for movement to and between rollers 10 and 12 for subjecting said webs to the action of the companion pairs of cutting members 58 and 60. Said guiding means comprises a support 98 fixed at the top of brackets 100 and fastened to and projecting upwardly from the top of frame F. Guiding members 102 are fixed to the support 98, each of said guiding members 102 being open at their opposite ends and providing a passage for the companion web. The top of each guiding member 102 is provided with a slot 104 through which access may be had to the web for facilitating threading the latter through the guide member. It will be understood that guiding members 102 are positioned so that the webs are disposed in proper position for the cutting action thereon of the companion cutting members 58 and 60.

While in accordance with the preferred form of the present invention described above with reference to Figs. 1 to 10, inclusive, a pair of cutting members 58 and 60 are utilized for producing the oppositely inclined cut edges on each strip S which is cut from the web by said pair of cutting members 58 and 60, it is within the scope of the present invention to utilize other cutting means and devices for severing said strips from the web and for providing said strips with said oppositely inclined end edges. Thus for example, as illustrated in Figs. 11 to 13, roller 10A which corresponds to the roller 10 of the machine described above is provided with cutting means including a cutting member 106 which takes the place of a pair of cutting members 58 and 60. For accomplishing this result cutting member 106 is movable from an inclined position corresponding to the inclined position of cutting member 58 to an inclined position corresponding to the inclined position of the companion cutting member 60 of the above described machine. Cutting member 106 is carried by a circular carrier member 108 journalled for oscillation in a bearing opening 110 provided in roller 10A near the periphery thereof. Said carrier 108 is fixed to a stem 112 which is journalled for oscillation or turning movement in a bearing 114 formed in said roller. A gear 116 is fixed to said stem and is engaged by a gear rack 118 fixed to a bar 120. Said bar 120 is provided with a longitudinal slot 128 through which stem 112 projects, bar 120 being slidable transversely of said stem. Rollers 122 are provided at the opposite ends of bar 120 in position to be engaged by cams 74 and 76 and described above with reference to the machine shown in Fig. 1. Bar 120 is guided for sliding movement longitudinally of roller 10A in guide openings 124 at the opposite ends of said roller. It will be understood that when bar 120 is moved longitudinally of said roller in either direction by said cams, rack 118 is similarly moved and by its engagement with gear 116 is effective to turn stem 112 and carrier plate 108 fixed thereto for moving cutting member 106 to the above described inclined positions thereof. The construction thus far described in reference to this modified form of the invention operates on one web, but since the machine is designed to cut a plurality of webs at the same time, a plurality of cutting members 106, one for each web, are provided. These additional cutting members are operated in the same way as just described by gearing the stems 112A of each of said additional cutting members to said stem 112. For this purpose, a gear 126 is fixed to stem 112 and meshes with a similar gear 126A fixed to an adjacent stem 112A. Stem 112A projects through said slot 128 in bar 120. Similarly when an additional cutter is provided, said gear 126A meshes with a similar gear on an adjacent stem. Thus, by reciprocating bar 120, a plurality of cutting members 106 are simultaneously moved to said inclined positions for providing the strips cut from each of a plurality of webs with the oppositely inclined edges.

In reference to the form of the invention illustrated in Fig. 1 and the associated figures of the drawings, it will be understood that the means for reciprocating the plate 54 which carries the cutting members 58 and 60 can be different than described above. As illustrated in Figs. 14 and 15, the means for moving plate 54 comprises plates 130 disposed at the opposite ends of roller 10 in position to engage the rollers 80A carried at the opposite ends of plate 54. Each of said plates 130 is provided with a central opening 132 for the extension therethrough of the adjacent ends of shaft 14 of roller 10. Plates 130 are fixed to reciprocating bars 134 and 136 which are mounted for reciprocation in companion bearings 138 provided at the upper ends of supporting posts 140 fixed to the frame F of the apparatus. The cam shaft 82A is mounted for rotation in bearings 142 and is rotated at one-half the speed of rotation of shaft 14 by virtue of the gear ratio of gears 88 and 90. A cylindrical grooved cam 144 of well-known construction is fixed to said cam shaft 82A and is rotated thereby, said cam groove being designed to reciprocate bar 136 whereby to move cutter plate 54, alternately, to the positions described above with reference to the form of the invention illustrated in Fig. 1, said cam being operatively connected to bar 136 by a cam follower 146 which is fixed to said bar and engages said cam. It will be understood that except for the mechanism just described for operating cutter plate 54, the machine here shown is of the same construction as the machine illustrated in Fig. 1.

While we have shown and described the preferred embodiment of our invention and modifications thereof, it will be understood that our invention may be embodied otherwise than as herein shown or described. Accordingly, we do not wish to be limited to the invention as herein illustrated or described except to the extent which may be required by the scope of the appended claims.

Having thus described our invention, what we claim and desire to secure by Letters Patent is:

1. In a machine for cutting strips from a web of sheet material, a pair of rollers between which the web is moved, cutting means carried by one of said rollers and operable at the bight of said rollers to sever successive strips from said web during the rotation of said rollers, said cutting means having cutting edges disposed in diverging relation and extending transversely of the direction of movement of said web and movable in relation to said one roller into and out of engagement with the web at the bight of said rollers whereby to provide the opposite ends of each strip with oppositely inclined cut edges simultaneously with the severing of said strips, respectively, from said web, and means operable in timed relation to the rotation of said rollers for moving said cutting means in relation to said one roller.

2. In a machine for cutting strips from a web of sheet material, a pair of rollers between which the web is moved during the rotation of said rollers, and cutting means operable in timed relation to the rotation of said rollers to cut said web into a plurality of strips, said cutting means being mounted for movement to positions to engage the web along lines spaced longitudinally of the web and extending in diverging relation transversely of the web whereby the opposite ends of each of said strips are defined by cut edges inclined in opposite directions, respectively, to the length of the strip, and means operable in timed relation to the rotation of said rollers for moving said cutting means to said positions.

3. In a machine for cutting strips from a web of sheet material, a pair of rollers between which the web is moved, cutting means carried by one of said rollers and operable at the bight of said rollers to sever a strip from said web, said cutting means comprising two cutting members movable in relation to said roller to positions into and out of the path of said web in the movement of the latter, said cutting members being in diverging relation whereby the opposite ends of the strips cut from the web by said cutting members are provided with oppositely inclined cut edges, means for rotating said rollers, and means operable in timed relation to the rotation of said rollers and operatively connected to said cutting means for positioning said cutting edges in and out of the path of the web.

4. In a machine for cutting strips from a web of sheet material, a pair of rollers between which the web is moved during the rotation of said rollers, and cutting means operable in timed relation to the rotation of said rollers to cut said web into a plurality of strips, said cutting means being mounted for movement to positions to engage the web along lines spaced longitudinally of the web and extending in diverging relation transversely of the web whereby the opposite ends of each of said strips are defined by cut edges inclined in opposite directions, respectively, to the length of the strip, a member mounted for movement longitudinally of one of said rollers and operatively connected to said cutting means for moving the latter to said positions thereof, and means operable in timed relation to said rollers for moving said member.

5. In a machine for cutting strips from a web of sheet material, a pair of rollers between which the web is moved during the rotation of said rollers, and cutting means operable in timed relation to the rotation of said rollers to cut said web into a plurality of strips, said cutting means being mounted for movement to positions to engage the web along lines spaced longitudinally of the web and extending in diverging relation transversely of the web whereby the opposite ends of each of said strips are defined by cut edges inclined in opposite directions, respectively, to the length of the strip, a member mounted for movement longitudinally of one of said rollers and operatively connected to said cutting means for moving the latter to said positions thereof, and cams releaseably engageable with the opposite ends, respectively, of said member for moving the latter in opposite directions longitudinally of said rollers.

6. In a machine for cutting strips from a web of sheet material, a pair of rollers between which the web is moved, a member mounted for movement longitudinally of one of said rollers, a pair of cutting members mounted for movement with said member, said cutting members being disposed in angular relation with respect to each other and extending transversely of the line of feed of the web between said rollers, said member being movable to one position in which one of said cutting members engages said web at the bight of said rollers and to another position in which the other of said cutting members engages the web at the bight of said rollers, and means for moving said member to dispose said cutting members in said positions.

7. In a machine for cutting strips from a web of sheet material, means for moving said web in the direction of its length, cutting means intermittently engageable with said web for severing therefrom strips of predetermined lengths, said cutting means being mounted for movement into and out of engagement with said web and also to different positions in which said cutting means engages said web at different angles in relation to the longitudinal line of the web whereby the opposite ends of said strips have cut edges which are in different angular relation to the length of the strip, means for moving said cutting means in timed relation to the movement of the web into and out of cutting engagement with said web, and additional means operable in timed relation to the movement of said web for moving said cutting means to said different position thereof.

8. In a machine for cutting strips from a web of sheet material, means for moving said web in the direction of its length, cutting means intermittently engageable with said web for severing therefrom strips of predetermined lengths, said cutting means having a pair of straight cutting edges disposed in angular relation, said cutting means being mounted for movement transversely of the longitudinal line of the web and into and out of engagement with said web, said cutting edges being engageable with said web at different angles, respectively, in relation to the longitudinal line of the web whereby the opposite ends of said strips have cut edges which are in different angular relation to the length of the strip, and means for moving said cutting means in timed relation to the movement of the web transversely of the longitudinal line of the web and into and out of engagement therewith.

9. In a machine for cutting strips from a web of sheet material, means for moving said web in the direction of its length, cutting means intermittently engageable with said web for severing therefrom strips of predetermined lengths, said cutting means comprising a cutting member having a straight cutting edge, a carrier for said cutting member mounted for turning movement whereby to position said cutting member for disposing said cutting edge at different angles to the length of the web, means for moving said cutting edge into and out of engagement with said web, and additional means for turning said carrier in timed relation to said last mentioned means.

10. In a machine for cutting strips from a web of sheet material, means for moving said web in the direction of its length, cutting means intermittently engageable with said web for severing therefrom strips of predetermined lengths, said cutting means comprising a cutting member having a straight cutting edge, a carrier for said cutting member mounted for oscillation whereby to position said cutting member for disposing said cutting edge at different angles to the length of the web, a gear fixed to said carrier, a rack engaging said gear for turning said carrier, and means for reciprocating said rack in timed relation to the operation of said web-moving means.

11. In a machine for cutting strips from a web of sheet material, a pair of rollers between which the web is moved, said rollers having a peripherally continuous bight relation, spring means for holding said rollers resiliently in said relation, a carrier mounted for reciprocation on one of said rollers parallel to the roller axis, cutting means carried by said carrier and movable thereby longitudinally of the rollers into and out of the path of movement of said web, means for rotating said rollers, cams mounted for movement and positioned to engage the opposite ends, respectively, of said carrier for reciprocating the latter, one of said cams being operable to move said carrier in one direction and another of said cams being operable to move said carrier in the opposite direction, and means for actuating said cams in timed relation to the rotation of said rollers.

12. In a machine for cutting strips from a web of sheet material, a pair of rollers between which the web is moved, a carrier mounted for reciprocation on one of said rollers parallel to the roller axis, cutting means carried by said carrier and movable thereby longitudinally of the rollers into and out of the path of movement of said web, means for rotating said rollers, cams mounted for movement and positioned to engage the opposite ends, respectively, of said carrier for reciprocating the latter, one of said cams being operable to move said carrier in one direction and another of said cams being operable to move said carrier in the opposite direction, and means for actuating said cams in timed relation to the rotation of said rollers.

13. In a machine for cutting a plurality of webs simultaneously, each into a plurality of strips, a pair of rollers, means for guiding said webs for movement to said rollers in paths in the direction of their respective lengths and in laterally spaced relation, cutting means carried by one of said rollers and operable at the bight thereof to cut said webs along transverse lines, said cutting means comprising a plurality of pairs of cutting edges, the cutting edges of each pair being disposed in diverging relation and extending transversely of the paths of web movement, said pairs of cutting edges being disposed in a row extending transversely of the paths of web movement and mounted for reciprocation to different positions in a path transversely of said web paths, the spacing of said webs by said guiding means and the positions of said cutting edges being such that in one of said positions of said cutting means two adjacent webs are cut by one pair of said cutting edges, respectively, and so that in another position of said cutting means said two adjacent webs are cut, respectively, by one cutting edge of said last mentioned pair and by a cutting edge of an adjacent pair, and means for reciprocating said cutting means in timed relation to the rotation of said rollers.

14. In a machine for cutting a plurality of webs simultaneously, each into a plurality of strips, a pair of rollers, means for guiding said webs for movement to said rollers in paths in the direction of their respective lengths and in laterally spaced relation, cutting means carried by one of said rollers and operable at the bight thereof to cut said webs along transverse lines, said cutting means being mounted for reciprocation in a path transverse to said paths of web movement, to different positions in relation to said web paths, and comprising three cutting edges disposed in a row extending in the direction of said path of reciprocation, the intermediate cutting edge of said three cutting edges being in diverging relation with each of the other two of said three cutting edges, the diverging relation with one of said two cutting edges being the reverse of the diverging relation with the other of said two cutting edges, all of said cutting edges extending transversely of said web paths, the spacing of said webs by said guiding means and the positions of said cutting edges being such that in one of said positions of said cutting means two adjacent webs are cut, respectively, by said intermediate cutting edge and one of said two other cutting edges, and so that in another position of said cutting means said two webs are cut, respectively, by the other of said two other cutting edges and by said intermediate cutting edge, and means for reciprocating said cutting means in timed relation to the rotation of said rollers.

15. In a machine for cutting a plurality of webs simultaneously, each into a plurality of strips, means for moving said webs longitudinally thereof in laterally spaced paths, cutting means mounted for reciprocation in a path transverse to said web paths, to different positions in relation to said web paths, said cutting means comprising three cutting edges disposed in a row extending in the direction of said path of reciprocation, the intermediate cutting edge of said three cutting edges being in diverging relation with each of the other two of said three cutting edges, the diverging relation with one of said two cutting edges being the reverse of the diverging relation with the other of said two cutting edges, all of said cutting edges extending transversely of said web paths, the spacing of said web paths and the positions of said cutting edges being such that in one of said positions of said cutting means two adjacent webs are cut, respectively, by said intermediate cutting edge and one of said two other cutting edges, and so that in another position of said cutting means said two webs are cut, respectively, by the other of said two other cutting edges and by said intermediate cutting edge, and means for reciprocating said cutting means in timed relation to said web-moving means.

16. In a machine for cutting a plurality of webs simultaneously, each into a plurality of strips, means including a roller for moving said webs longitudinally thereof in laterally spaced paths, a member mounted for reciprocation on said roller longitudinally thereof in a path transverse to said web paths, a plurality of carrier members mounted on said roller for turning movement relative thereto, cutter members carried by said carrier members, respectively, said cutter members being in spaced relation longitudinally of the roller in positions to engage said webs, respectively, and to sever strips therefrom by cutting the companion webs along spaced transverse lines inclined to the longitudinal lines of said webs, respectively, and means operatively connecting said reciprocatory member to said carriers for turning them simultaneously for positioning said cutting members in predetermined relation to said longitudinal lines of said webs.

17. In a machine for cutting a plurality of webs simultaneously, each into a plurality of strips, a pair of rollers between which said webs are moved longitudinally in laterally spaced paths, means for rotating said rollers, cutting means carried by one of said rollers and mounted for movement in relation to said one roller to different positions, said cutting means comprising cutting edges which extend transversely of said web paths in each of said different positions at different angles to the longitudinal lines of said webs for cutting said webs, each along spaced transverse lines corresponding to said different angles, and means for moving said cutting means in timed relation to the rotation of said rollers.

18. In a machine for cutting strips from a web of sheet material, a pair of rollers between which the web is moved, a member mounted for movement longitudinally of one of said rollers, a pair of cutting members mounted for movement with said member, said cutting members being disposed in angular relation with respect to each other and extending transversely of the line of feed of the web between said rollers, said member being movable to one position in which one of said cutting members engages said web at the bight of said rollers and to another position in which the other of said cutting members engages the web at the bight of said rollers, and means for moving said member to dispose said cutting members in said positions, said last mentioned means comprising a pair of members mounted at opposite ends, respectively, of said one of the rollers for reciprocating movement longitudinally of the roller axis in operative relation to the adjacent ends of said first mentioned member for moving the latter, and means operable in timed relation to said rollers for reciprocating said pair of members.

CHARLES LESTER LOVERCH.
JACOB K. RUBIN.